US012648518B2

(12) United States Patent
Andreasson

(10) Patent No.: US 12,648,518 B2
(45) Date of Patent: Jun. 9, 2026

(54) TRIMMER HEAD

(71) Applicant: T&I CONSULTING AB, Saltsjöbaden (SE)

(72) Inventor: Bo Christer Andreasson, Saltsjöbaden (SE)

(73) Assignee: T&I Consulting AB, Saltsjöbaden (SE)

( * ) Notice: Subject to any disclaimer, the term of this patent is extended or adjusted under 35 U.S.C. 154(b) by 676 days.

(21) Appl. No.: 17/797,530

(22) PCT Filed: Apr. 23, 2020

(86) PCT No.: PCT/EP2020/061395
§ 371 (c)(1),
(2) Date: Aug. 4, 2022

(87) PCT Pub. No.: WO2021/170255
PCT Pub. Date: Sep. 2, 2021

(65) Prior Publication Data
US 2023/0091353 A1 Mar. 23, 2023

(30) Foreign Application Priority Data
Feb. 27, 2020 (PT) ........................................ 116136

(51) Int. Cl.
| | |
|---|---|
| *A01D 34/82* | (2006.01) |
| *A01D 34/416* | (2006.01) |
| *A01D 34/81* | (2006.01) |
| *A01D 43/077* | (2006.01) |

(52) U.S. Cl.
CPC .......... *A01D 34/82* (2013.01); *A01D 34/416* (2013.01); *A01D 34/4167* (2013.01); *A01D 34/81* (2013.01); *A01D 34/828* (2013.01); *A01D 43/077* (2013.01)

(58) Field of Classification Search
CPC ................ A01D 34/412; A01D 34/416; A01D 34/4167; A01D 34/73; A01D 34/81; A01D 34/82; A01D 34/828; A01D 34/90; A01D 43/077; A01G 3/0535
USPC ........................................ 30/123, 123.3, 276
See application file for complete search history.

(56) References Cited

U.S. PATENT DOCUMENTS

| | | | | |
|---|---|---|---|---|
| 2,883,746 A | * | 4/1959 | Gilsi .................... | A01G 3/0535 30/276 |
| 3,877,146 A | * | 4/1975 | Pittinger ................ | A01D 34/73 30/276 |
| 4,242,794 A | * | 1/1981 | Peterson ............... | E01H 1/0809 30/276 |

(Continued)

FOREIGN PATENT DOCUMENTS

WO 2010062199 A2 6/2010

OTHER PUBLICATIONS

International Search Report, PCT/EP2020/061395, Mailed Nov. 19, 2020.

*Primary Examiner* — Jason Daniel Prone
(74) *Attorney, Agent, or Firm* — Calderone McKay LLC

(57) ABSTRACT

A trimmer head for vegetation trimming and cutting machines. The trimmer head including a housing; a cutting blade; a cutting blade shield with a plurality of through-openings; and a blowing air assembly that has at least one blowing nozzle pointing to the blade shield openings such that, in operation, a blowing air flow is directed from the blowing nozzle towards the blade shield openings.

16 Claims, 8 Drawing Sheets

(56)                    References Cited

U.S. PATENT DOCUMENTS

| | | | | |
|---|---|---|---|---|
| 4,483,070 | A * | 11/1984 | Junkermann | A01G 3/0535 |
| | | | | 30/276 |
| 4,733,471 | A * | 3/1988 | Rahe | A01D 34/90 |
| | | | | 30/276 |
| 4,987,681 | A | 1/1991 | Sepke | |
| 5,199,174 | A * | 4/1993 | Wild | B23Q 11/005 |
| | | | | 30/123.3 |
| 5,689,884 | A * | 11/1997 | Wershe | B23D 47/005 |
| | | | | 30/123.3 |
| 6,415,585 | B2 * | 7/2002 | Morabit | A01D 34/416 |
| | | | | 30/276 |
| 6,665,941 | B1 * | 12/2003 | Teeple | A01D 34/84 |
| | | | | 30/276 |
| 6,665,943 | B1 * | 12/2003 | Sloane | A01G 3/0535 |
| | | | | 30/276 |
| 2006/0005347 | A1 * | 1/2006 | Griffin | A01D 34/416 |
| | | | | 15/405 |
| 2006/0123635 | A1 * | 6/2006 | Hurley | A01D 34/4163 |
| | | | | 30/276 |
| 2010/0126023 | A1 * | 5/2010 | Griffin | A01D 42/06 |
| | | | | 30/276 |
| 2011/0131815 | A1 * | 6/2011 | Hurley | A01D 34/90 |
| | | | | 30/276 |
| 2015/0233413 | A1 * | 8/2015 | Scherer | A01D 34/90 |
| | | | | 30/276 |
| 2017/0290261 | A1 | 10/2017 | Floyd | |
| 2018/0103582 | A1 * | 4/2018 | Self | A01D 34/416 |
| 2023/0053673 | A1 * | 2/2023 | Andreasson | A01D 34/4167 |

* cited by examiner

TRIMMER HEAD

FIELD OF THE INVENTION

The subject invention relates to a trimmer head for vegetation trimming and cutting machines. The invention belongs to the field of apparatus for trimming and cutting grass, small bush wood, hedges, weed and reed.

BACKGROUND OF THE INVENTION

Globally, there is a huge market for trimmers, brush cutters, hedge trimmers and clearing saws. There is a large global population of grass and weed trimmers with trimmer lines in use. This population has been built up over several decades.

Products with trimmer heads equipped with flexible trimmer lines are common both for consumer and commercial use.

Trimmer products are made in different sizes, powered by corded electric motors, cordless electric motors and combustion engines. The power range spans from a few hundred Watts to about 3 kW.

Trimmer line thicknesses usually range in between 1.5 to 4 mm.

Trimmer lines can wear quickly and break frequently. Therefore, continuous replacement of the lines is necessary.

To achieve a high performance, the trimmer line must repeatedly be adjusted to the correct length. The adjustment can be made manually, semi-automatically or fully automatically depending on trimmer head type.

One advantage of trimmer lines is they can be used close to objects and materials like concrete, stones, trees and other. Another advantage is the trimmer line has a consistent performance. If it wears or breaks, some more line could be fed out.

On the other hand, trimmer lines could leave some bad-looking marks on objects due to occasional hits during operation.

Moreover, flexible trimmer lines are usually made of various plastic materials. One disadvantage is worn or broken-off plastic pieces are wasted and accumulated where the trimmer lines are used. It could take several decades or even more to fully break down such plastic materials. Trimmer lines made of biodegradable plastic materials are better in this respect but it could still take more than a decade to fully break them down. This means, even with biodegradable trimmer lines, there will be an accumulation of plastic material waste on the ground. Recycling is not possible or at least very difficult. The conclusion is, trimmer lines contribute to the littering and aggravation of the global environmental situation. Cutting blades made of metal are better in this respect and they can easily be recycled.

Grass cutters and brush cutters frequently also use rotating cutting knives and cutting blades to cut and trim grass and other vegetation. Such knives and blades are normally not fully shielded. While they are effective in operation, they can destroy objects or at least leave bad-looking marks, plus they easily get dull or destroyed if they hit hard objects.

Both flexible trimmer lines and unshielded cutting blades have a further drawback of sometimes scalping the lawn or other vegetation.

Products using flexible trimmer lines and cutting blades generally have protection guards of various design. Typically, the protection guards do not fully cover the trimmer lines and cutting blades.

U.S. Pat. No. 4,987,681A discloses a hand grass trimmer where different types of guards are applied. One of the designs is a front guard with a plurality of tines with openings in between to allow the grass to come through for cutting. Furthermore, as an alternative, U.S. Pat. No. 4,987,681A includes a full circle top protection for the trimmer line and an optional partially open bottom cover plate. Still, some of the rotating parts are not shielded.

EP1364571A2 discloses a vegetation cutting tool with a reversible electric motor. The cutting tool could be either a trimmer line or a cutting blade. The trimming tool may also be equipped with a blower feature as part of the trimming guard of the trimming tool, or, a blower assembly integrated into the tool components. The blowing direction is to the front, away from the operator, such that it works as a radial blower to spread debris (leaves, small stones) away from the cutting blades/lines. The trimming guard shown does not protect the full circle and it has no bottom cover protection shield.

GB1143812A discloses a clipping machine with cutting blades mounted in between two plates. The cutting edges of the knives are not guarded and stick out in between the plates. The bottom plate also works as a ground protection shield. As the knife edges are not shielded, this could be a safety concern.

US2017290261A1 discloses a guard for a flexible rotating cutting element. The guard could cover a part of the perimeter or a full 360 degrees. The guard could also be equipped with slots. There is no ground protection shield. The trimmer line and other rotating parts are accessible also when the trimmer is running.

Both trimmer lines and cutting blades have a certain centrifugal fan effect. As a result, the grass to be cut could to some extent be blown away from the cutting means. This fan effect is smaller, though not negligible, for flat and thin cutting blades with just a few cutting knives.

Therefore, a need exists for a trimmer head that overcomes the drawbacks and limitations of the prior art. In particular, there is a need for a more environmentally sound trimmer head that also may increase the cutting efficiency.

BRIEF DESCRIPTION OF THE DRAWINGS

In the following, a detailed description of the invention is provided making reference to the appended drawings, in which.

SUMMARY OF THE INVENTION

Figure 1:
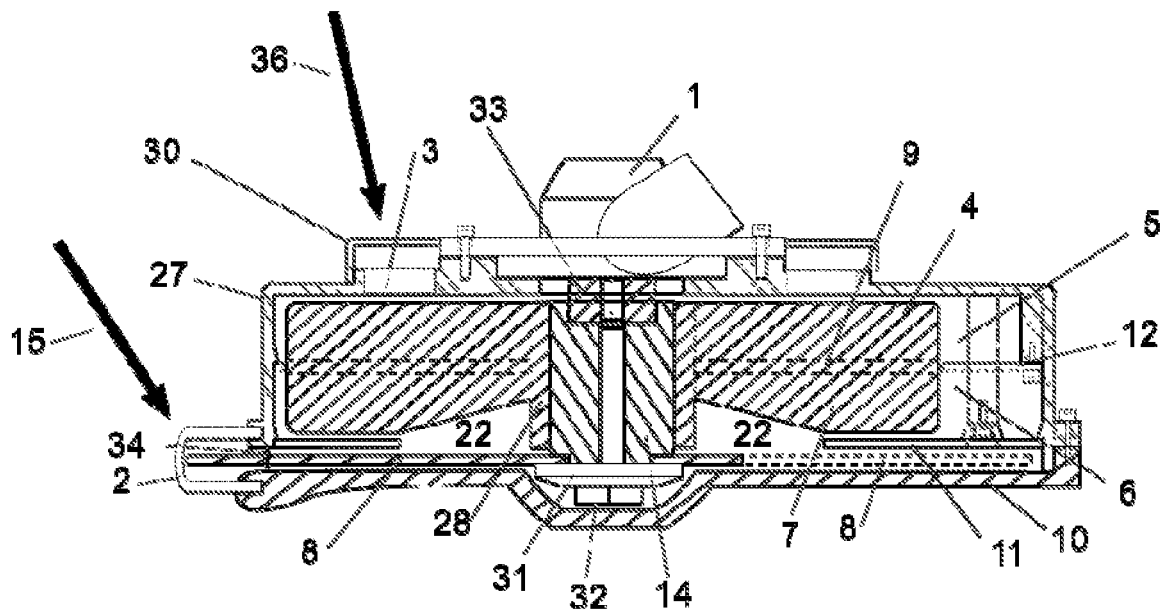
FIG. 1 shows a section view of a trimmer head of the invention without blowing air distribution chamber (40).

The subject invention relates to a trimmer head for vegetation trimming and cutting machines.

The trimmer head comprises a housing (27); a cutting blade (8); a cutting blade shield (2) with a plurality of cutting blade shield openings (21); and a blowing air assembly that comprises at least one blowing nozzle (41) pointing to the cutting blade shield openings (21) such that, in operation, a blowing air flow is directed from the blowing nozzle (41) towards said cutting blade shield openings (21).

In a preferred embodiment, said, at least one, blowing nozzle (41) is flexible. According to different embodiments, the blowing nozzle (41) may be rigid, angled, self-adjustable or a combination thereof.

In a further embodiment, the blowing air assembly comprises a blowing centrifugal fan (4) arranged in air-connection with said, at least one, blowing nozzle (41), such that, in operation, the blowing centrifugal fan (4) blows air through said, at least one, nozzle (41). Preferably, an air filter (30) is arranged upstream the blowing centrifugal fan (4), such that, in operation, it filters an intake air to the blowing centrifugal fan (4). More preferably, a blowing air distribution chamber (40) is arranged in air-connection between the, at least one, blowing nozzle (41) and the blowing centrifugal fan (4), such that, in operation, an air flow is distributed from said distribution chamber (40) to said, at least one, blowing nozzle (41).

The said blowing air distribution chamber (40) may be detachable from the trimmer head housing (27).

In a further embodiment, in addition to the blowing air assembly comprising a blowing fan (4), the trimmer head further comprises a vacuum assembly provided with a vacuum intake (34), wherein the vacuum intake (34) is arranged such that the cutting blade shield (2) lies in-between the, at least one, blowing nozzle (41) and the said vacuum intake (34). Preferably, a vacuum centrifugal fan (7) is arranged in air-connection with the vacuum intake (34). More preferably, the blowing centrifugal fan (4) and the vacuum centrifugal fan (7) are integrated as a single fan wheel (28) having a separation wall (9) in between the blowing centrifugal fan (4) and the vacuum fan. Even more preferably, the blowing centrifugal fan (4) and vacuum centrifugal fan (7) each has 8 to 20 fan wings (39). In a particular embodiment, each of the blowing centrifugal fan 4 and the vacuum centrifugal fan has 14 fan wings (39) and the fan wings (39) are straight-shaped.

The trimmer head of any of the previous embodiments may be provided with a ground shield (10) attached to the housing (27), wherein the ground shield (10) is fixed to or detachable from the housing (27).

Preferably, each of the plurality of the cutting blade shield openings (21) has a width in the range of 4 to 12 mm, and the blade shield (2) is attachable to and detachable from the housing (27).

DETAILED DESCRIPTION OF THE INVENTION

The present invention relates to a new type of trimmer head with an enclosed and guarded cutting blade to improve safety, performance, and environmental aspects.

The present trimmer head is designed to replace regular grass trimmer heads with flexible trimmer lines for many work situations. In several cases it also replaces regular cutting blades.

The trimmer head of the present invention is also suitable to be applied in robotic lawn mowers.

In the operational context of the present invention, it should be mentioned that blowing air is an efficient way to move objects, as the total air-stream pressure is affecting the objects to be moved. Hand-held blowers and back-pack blowers for garden use are good examples, where objects several meters from the blower nozzle could easily be moved with a blower fan power ranging in between a few hundred Watts and 3 kW.

On the other hand, vacuuming objects is more difficult, even at the same total air flow rate and the same power of the motor. Vacuuming objects requires the vacuum nozzle comes very close to the object to be vacuumed. Vacuum cleaners in general is a good example. Neither the air-speed nor the vacuum is sufficient to generate enough pulling force at a distance and the static vacuum pressure rapidly loses power when the distance to the nozzle increases. Even a small increase of the distance between an object and the vacuum nozzle could cause a significant drop of the vacuum pulling force.

Vacuum nozzles, opposite to blow nozzles, do not create a concentrated air stream that can move objects at a long distance. Instead, the air-flow becomes more spread out and the air-flow speed becomes significantly slower when the distance increases. In spite of regular vacuum cleaners have relatively high power, the reach to pull in an object into the vacuum cleaner tube is not more than a couple of centimeters or even less than 1 centimeter.

The EJECTOR principle is a well-known phenomenon, where a free jet of air pulls in air from around the air stream due to the lower static pressure of the air stream. By using this effect, the total mass-flow of air could be significantly larger than the mass flow from the air nozzle itself.

The COANDA effect is also a well-known phenomenon which explains why a flow of a flowing substance follows a surface. This is because the flow has a lower static pressure. For an air-flow close to a surface, this means the flowing air tends to follow the surface due to the pressure difference between the atmospheric pressure and the lower static pressure of the air-stream moves the air-stream towards the surface.

In the course of the present description, the EJECTOR principle and the COANDA effect are referred to as EJECTOR and COANDA.

Replacing a flexible trimmer line by a cutting blade design requires, for a safe and durable operation, that the cutting blade must be shielded. Then, it is necessary to feed grass or other vegetation through the cutting blade shield to be cut by the blade. In order to accomplish such task, the blade shield must comprise through-openings that allow the vegetation to reach the blade. By properly dimensioning the size of said openings, it is possible to combine the effects of protection of the blade and surrounding objects and walls with the safety of users and/or other surrounding persons while assuring the desired cutting of vegetation.

However, just to move such a shielded cutting blade towards or through the grass would not give the desired performance as there would not be enough grass coming through the cutting blade shield.

Therefore, the present invention resorts to an airstream to bring the vegetation towards and through the blade shield. This is not disclosed in the prior art and it is even taught away (for example by EP 1364571 A2), since it is known a radial blower that is intended to spread debris (leaves, small stones) away from the cutting blades/lines.

In a first attempt of accomplish the effect of bringing the vegetation towards and through the blade shield, a centrifugal fan creating a vacuum flow with an air intake behind the cutting blade shield was used. However, even with the vacuum intake arranged close to the shield, the resulting effect revealed insufficient.

It has been found that by blowing air created by a blowing air assembly towards the cutting blade shield, the above effect is fully achieved. As an embodiment, a centrifugal fan that blows air through air nozzles pointing to the blade shield may achieve the said effect.

Also, even more effective, while optional, is to combine the above-mentioned vacuum flow with said air blowing through air nozzles directed towards the cutting blade shield. By this solution, the vegetation is affected by blowing air also, which has a much stronger total effect. It has been found that the blowing air-flow and the vacuum air-flow support each other into a powerful airstream. It is believed that the EJECTOR effect adds extra air to the air stream, and the COANDA effect makes some of the air-stream to attach to the trimmer head housing, from where it will flow through the cutting blade shield openings.

The blowing air-flow and vacuum air-flow create a continuous air stream that pushes the vegetation from behind and pulls from the front. Surprisingly, even though the vacuum effect is smaller than the blowing effect, it seems to play a role in directing the blowing air towards and through the cutting blade shield openings.

The average air speed through the cutting blade shield openings is smaller compared to the vacuum intake area. This is because the blade shield openings and opening area must be big enough to allow the vegetation to reach the cutting blade.

Figure 6:
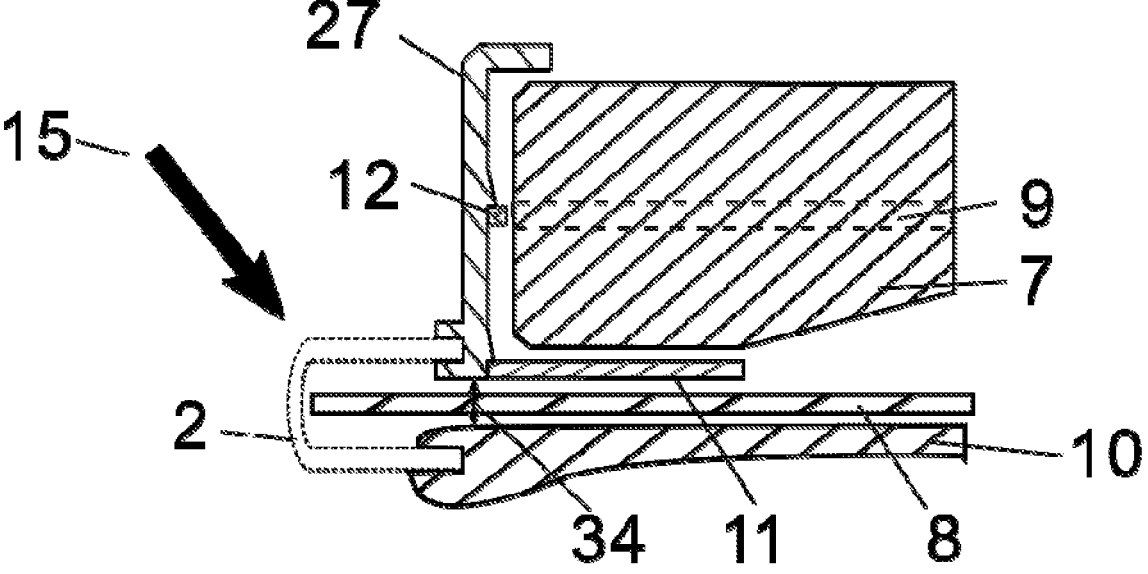
FIG. 6 shows a magnified section view of part of a trimmer head of the invention.

The stronger vacuum area that directs the air-stream as vacuum air intake (34) is situated slightly behind the front of the cutting blade shield (2), see FIG. 6 as an opening in housing. Here, the total intake area for the vacuum air-flow is smaller and the air-speed is in the range of 15-30 m/s at normal operational rotational speeds for the cutting blade and the fans. The vacuum pressure is in the range of 15-55 mmH2O, depending on the overall design and the fan speed, and also works as a targeting area for the blowing and vacuuming air-stream.

The fact that there is a cutting blade shield in between the vacuum intake and the incoming air-flow stream has no significance. As the total area of the openings in the cutting blade shield is bigger makes the cutting blade shield transparent to the air-flow stream.

The air-flow stream will therefore just pass through parts of the cutting blade shield openings and guide the vegetation through to the vacuum intake.

All of this have been observed and concluded from a prototype operation.

The blowing air-speed from the blowing air nozzles is typically about 35-60 m/s but could be designed to be both higher or lower. The speed depends on the size and speed of the fan wheel and the total number and area of the air nozzles.

FIG. 6 shows a magnification view of the air intake through the cutting blade shield (2) with the trimmer head housing (27), which in this embodiment is made of injection molded or 3D printed plastics, the cutting blade shield (2), the ground shield (10), the vacuum fan intake air guide plate (11), the cutting blade (8), the separating shield (12), and the air-gap opening in trimmer head housing (27) for the vacuum fan air intake (34). The separating shield (12) is between the blowing fan scroll (5) and the vacuum fan scroll (6) as shown in FIG. 1. The cutting blade (8) does not restrict the flow as it just covers a smaller part of the perimeter, as shown in FIG. 6. In the present embodiment, heat treated steel is the choice for the cutting blade material.

The small fan effect of the cutting blade is largely overpowered by the vacuum and blowing fans separately or together. There could however be an insignificant reduction of the vacuum-blowing air-stream flow. One reason the reduction is small may be the fact that cutting blade has only 3 knives, thus most of the intake area has no restriction or blowing effect from the cutting blade. Another reason is the cutting blade is relatively thin, limiting the fan effect.

Figure 3:
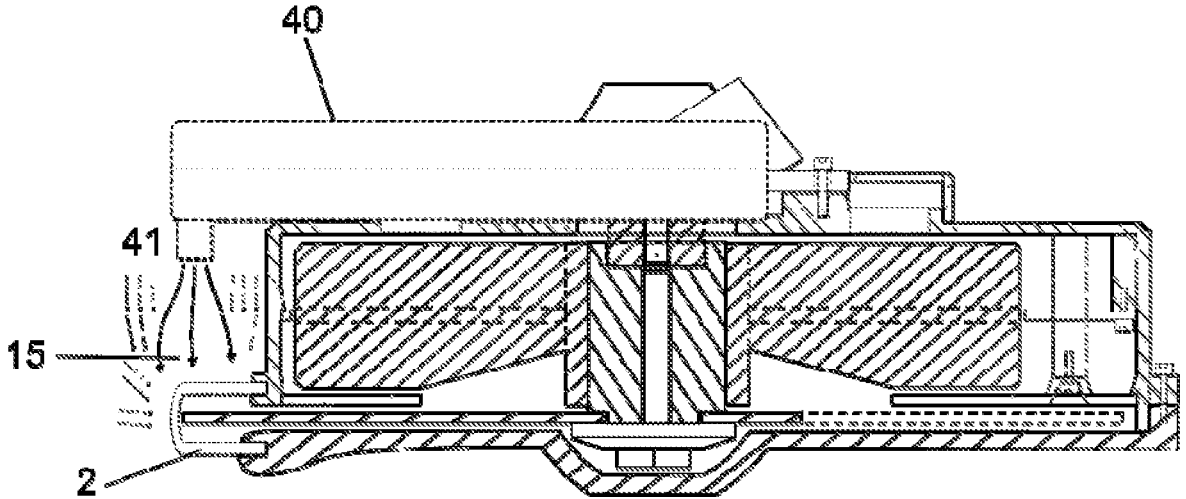
FIG. 3 illustrates a section view of the trimmer head comprising a blowing air distribution chamber (40) and blowing nozzles pointing straight down.
Figure 4:
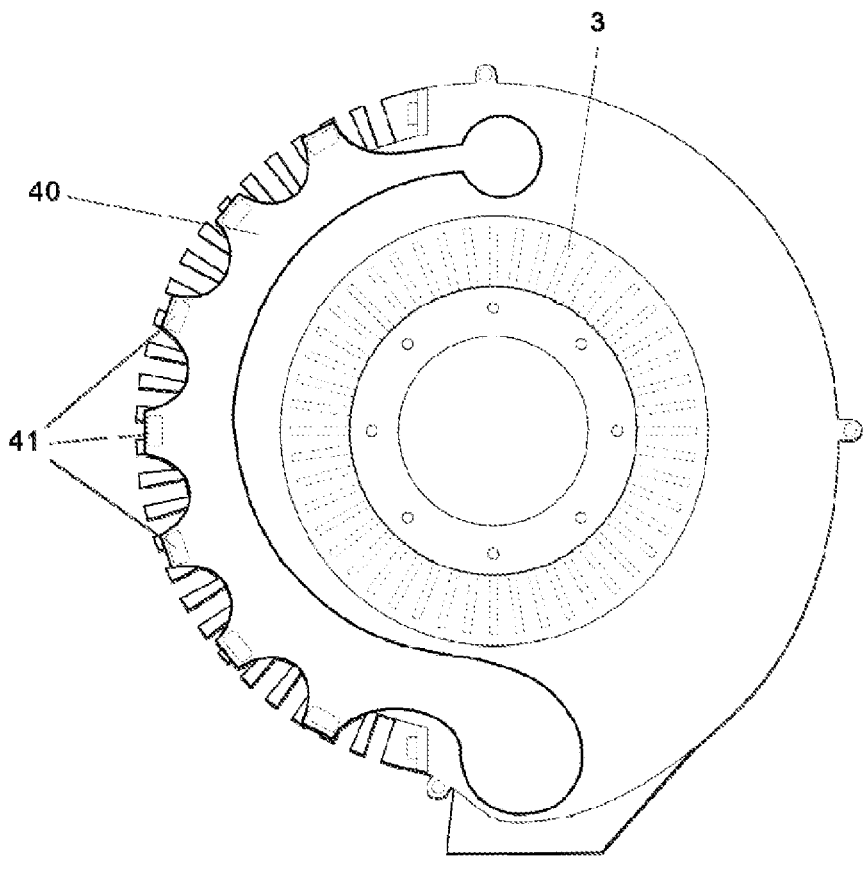
FIG. 4 shows a top view of the trimmer head of FIG. 3.

The fans and cutting blade are integrated into the cutting device housing, while the blowing air distribution chamber and the non-flexible blowing nozzles could be mounted to the outside of the housing. See FIGS. 3 and 4 illustrating the configuration. This embodiment is a neat and efficient solution, where the cutting device head easily can trim and cut vegetation close to objects.

The air nozzle (41) in FIG. 3 is pointing straight down. The air nozzle(s) could however have any other suitable angle, for example pointing slightly towards the vacuum air intake.

The air distribution chamber and the air blowing nozzles could alternatively be integrated with the housing depending on manufacturing method. For example, using 3D printing methods.

Figure 7:
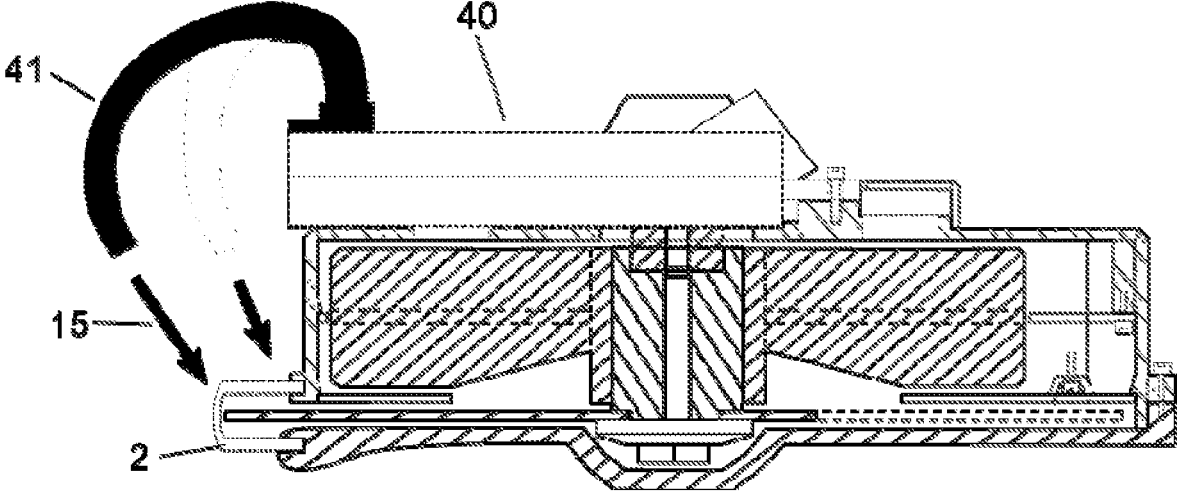
FIG. 7 shows a section view of an embodiment comprising blowing air nozzles (41) that are made in a flexible material.

As an alternative, the blowing nozzles can be made of a flexible material attached to the air distribution chamber. See FIGS. 7 and 8. The advantage with this solution is the blowing-vacuuming air-flow stream would have a longer reach as the flexible nozzles sticks out from the trimmer housing and create a larger blowing-vacuuming zone. The flexible blowing nozzles may come close to objects and when contact occurs, the nozzles will be pushed backwards in relation to their original positioning but still maintaining the air flow directed to the blade shield. FIG. 7, shows a bent or deformed shape of a blowing air nozzle (41)_upon contact with an object.

Another effect of the flexible nozzles is the self-adjusting distance to the cutting blade shield depending on the fan speed and the air speed from the air nozzles. When the airspeed increases, the flexible nozzles will be pushed backward, extending the blowing-vacuuming zone and vice versa. In this way, the efficiency will always be kept high.

An embodiment making use of two fans and two fan scrolls enables keeping the blowing air as clean as possible to extend the maintenance intervals. It also has the benefit of the blowing air always has full power even if there is a lot of vegetation in between the blowing fan jets and the cutting blade shield.

Optionally while advantageously, an air filter (30) can be arranged upstream the blowing centrifugal fan (4) so as to filter the intake air to the blowing centrifugal fan (4). In other words, an air filter (30) can be mounted before the intake to the blowing centrifugal fan (4). Preferably, the air filter (30) is a wire-mesh filter made of plastics or metal. Of course, other available embodiments may be used. The air filter (30) is shown in FIG. 1.

The vacuumed air contains a mix of air, cut vegetation pieces and dirt. The vacuum fan scroll outlet (19) is therefore directed both from the operator and from the cutting blade shield to avoid already cut vegetation re-enters the system. The vacuum fan scroll outlet (19) can be designed to create a concentrated flow or a more diffused flow. The output flow deflector could also be designed to guide the flow downwards.

Preferably, the whole design is made to be as self-cleaning as possible in order to extend the maintenance intervals. Because of this, the clearance between the fans, the fan housing and other internal components is kept small, where it is functionally possible, to also get a continuous mechanical cleaning. The same principle applies for the cutting blade, that also keeps the inside of the cutting blade shield free from cut vegetation pieces and dirt. The fan wings are designed to collect as little dirt as possible.

The blowing air has also an important cleaning function as it blows away cut vegetation, so it does not clog the cutting blade shield. The cleaning by the blowing air will work in all situations as the blowing air always has full power.

Additional cleaning of the vacuum fan could be made by detaching the ground shield. If an even more extensive cleaning would be required, the bolt that keeps the cutting blade and the fan wheel in place could be detached. In most cases it should however be sufficient to clean by using compressed air, rinsing by water or other.

It is of service convenience that air distribution chamber should easily be detached in case the chamber or the fixed air nozzles need extra cleaning. Cleaning the fixed air nozzles could easily be done from the outside.

If the flexible blowing air nozzles and the blowing air distribution chamber would require extra cleaning they could be detached for cleaning or cleaned by compressed air, rinsed by water or other.

One concern is, there could be a leakage of air in between the vacuum air and blowing air fan scrolls. This could occur in the gap between the blowing centrifugal fan (4) and the vacuum centrifugal fan (7) and the separation wall (12) shown in FIG. 1. In such a case the leak flow would be from the clean air side to the vacuum side. This is because the vacuum scroll is more open to the atmosphere and the blowing air distribution chamber and the blowing nozzles build up a certain static over-pressure. This means there is no or very limited risk a potential leak flow could transfer dirt into the blowing system.

Figure 2:
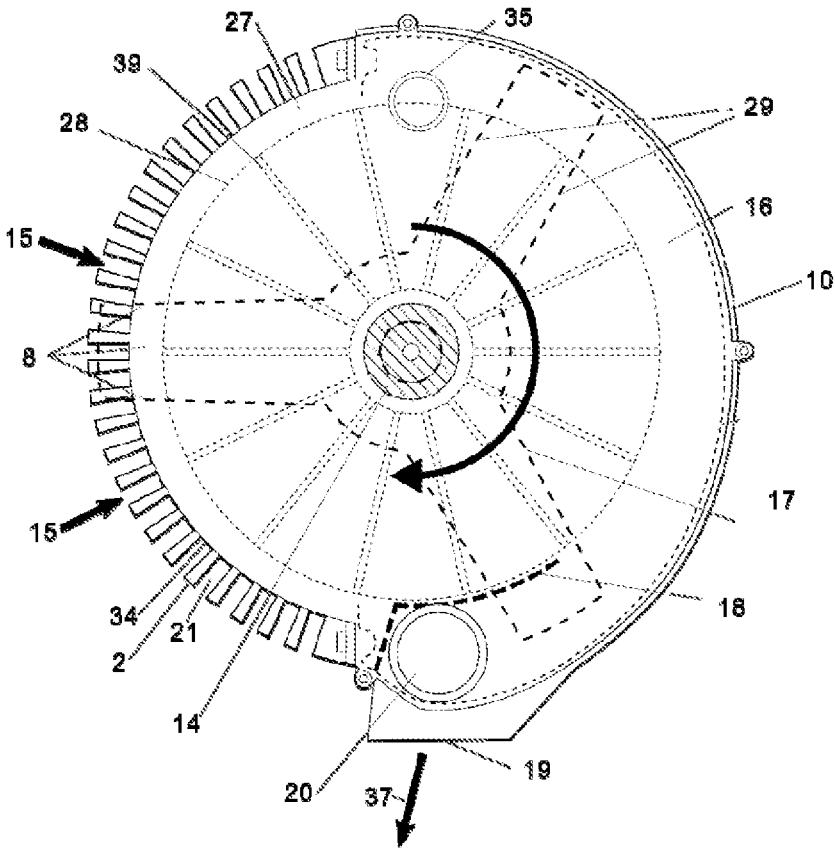
FIG. 2 shows a top view of the trimmer head of FIG. 1.

Referring to the embodiment of FIG. 2, the vacuum centrifugal fan (7) and the blowing centrifugal fan (7) each have 14 straight fan wings (39) in this design. The number of fan wings (39) should be in the range of 8-20 wings for best performance and dirt resistance. Straight fan wings limit the risk for cut vegetation and other dirt would stick to the wings. Furthermore, the cutting blade (8) has 3 cutting blade knives (17) in this design not to unnecessarily restrict the vacuum air-flow. The cutting blade can be turned around for longer life-time as the cutting blade knives (17) have sharp edges (29) on both sides.

The cutting blade could as an alternative be made of a central part with hinged moving knives mounted to the central part.

Furthermore, referring to the embodiment of FIG. 2, the cutting blade shield (2) and the cutting blade shield openings (21) could have different depths depending on application. The cutting blade shield openings (21) could also have different widths and the cutting blade shield (21) could cover different perimeter angles. Preferably, the cutting blade shield (21) covers a perimeter of at least 120 angle degrees.

The width of each of the cutting blade shield openings (21) should be in the range of 4 to 12 mm, preferably it is in the range of 4-8 mm. Bigger sizes may be required for certain work situations. This is possible as the cutting blade shield is interchangeable. The maximum size of the cutting blade shield openings depends on work type, user experience and safety requirements including personal protective equipment.

The operational speed of cutting blade with a diameter of about 250 mm is typically in the range of 5000-9000 RPM.

A more detailed description of FIGS. 1 to 8 is provided hereinafter.

FIGS. 1 and 2 show an embodiment of the cutting blade trimmer head attached to a gear-box (1), (or flexible shaft attachment), with a housing (27), a cutting blade (8), a cutting blade shield (2) with cutting blade shield openings (21) for the vacuum air intake flow and for the vegetation to be cut, a blowing centrifugal fan (4) for clean air, a vacuum centrifugal fan (7) with an vacuum air intake (34), a blowing fan scroll (5) and a vacuum fan scroll 6 for the blowing and vacuum air-flows, respectively. There is a separation wall (12) between the blowing fan scroll (5) and the vacuum fan scroll (6). Furthermore, there is an intake air guide plate (11) for the air intake (22) to the vacuum centrifugal fan (7). The arrows (15) exemplifies the air-flow towards and through the cutting blade shield (2). The blowing centrifugal fan (4) and the vacuum centrifugal fan (7) are in this embodiment created by using a single molded, die-cast or 3D-printed fan wheel (28) only, with an integrated separation wall (9) in between the blowing centrifugal fan (4) and the vacuum centrifugal fan (7). The fan wheel (28) also has an insert hub (14). In this design the diameter of the blowing centrifugal fan (4) and the vacuum centrifugal fan (7) is 250 mm. The fan scrolls (16) have the same basic shape except for the outlets. Furthermore, to save space the fan scrolls do not cover the full outer perimeter of the fan wheel. A ground shield (10) enhances the safety and also protects the vegetation and the cutting blade. An optional air filter (30) could be attached before the air intake (3) to the blowing centrifugal fan (4). The arrow (36) illustrates the air-flow into the blowing centrifugal fan (4) through the air filter (30) and the air intake (3). The cutting blade (8) and the fan wheel (28) with the blowing centrifugal fan (4) and the vacuum centrifugal fan (7) are kept in place by a washer (31) and a bolt (32) that goes through the hub (14) of the fan wheel (28) and is bolted to the hub (33) of the gearbox/flexible shaft (1). To mount or demount the cutting blade, the ground shield (10) must first be detached.

FIG. 2 shows the housing (27), the cutting blade shield (2), the shape of the cutting blade (8), the sharp edges (29) of the cutting blade knives (17), totally three cutting blade knives in this embodiment, the shape of the fan wheel (28) and the fan wheel wings (39), the shape of the fan scrolls (16), the finger protection (18) for the fans for each fan scroll, the blowing fan clean air outlet (20), the arrow (15) showing the air-flow towards and through the cutting blade shield (2), the cutting blade shield openings (21) and the vacuum air intake (34) just behind the cutting blade shield (2). A vacuum air fan scroll outlet (19) is directed not to disturb the vacuum intake air flow and also not to distract the operator. The arrow (37) shows the direction of the air-flow from the vacuum air fan scroll outlet (19). A mounting flange (35) is also shown for the air distribution chamber. There is also another mounting flange for the air distribution chamber around the blowing fan clean air outlet (20).

FIG. 1 also shows that the vacuum air intake (34) is located just behind the cutting blade shield (2), the arrow (15) shows the air flow towards and through the cutting blade shield (2) and the fan wheel (28), each side with 14 fan wings for the blowing centrifugal fan 4 and the vacuum centrifugal fan (7).

As an option, a mechanism could be engaged when removing the ground shield to prevent the cutting blade from rotating.

FIG. 3 is a sectional view of a trimmer head comprising a blowing air distribution chamber (40) with integrated blowing air nozzles (41). Extra air is added by the EJECTOR effect. In this figure, the blowing air nozzles (41) point straight down but any suitable angle could be used. The arrow (15) shows that the air-flow from the blowing air nozzles (41) is directed towards the cutting blade shield (2).

FIG. 4 shows a top view of the trimmer head with air intake openings for the air air intake (3), the blowing air distribution chamber (40) with integrated fixed blowing air nozzles (41). The blowing air nozzles could be designed with any suitable angle towards the cutting blade shield.

Figure 5:
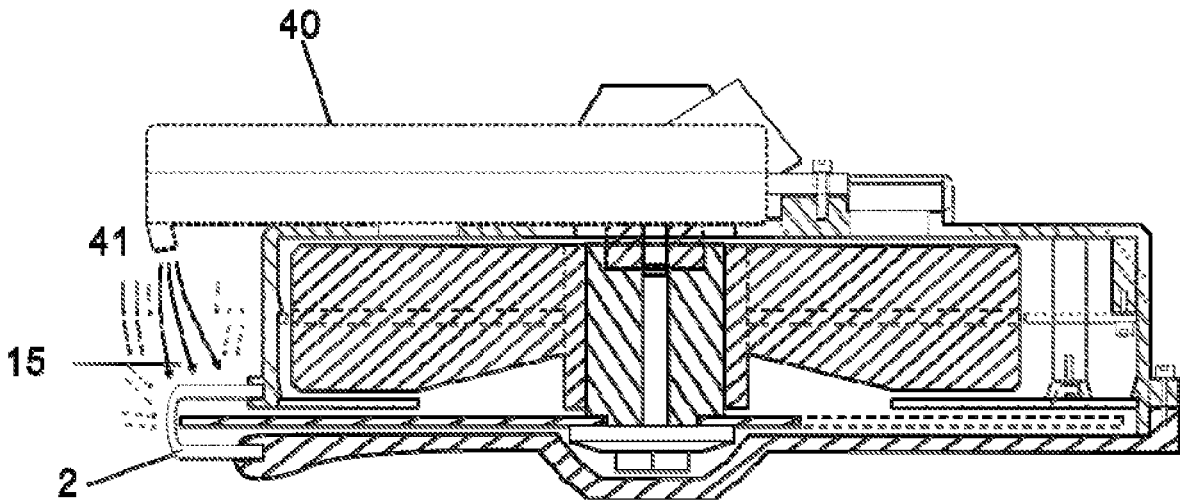
FIG. 5 shows a section view of a trimmer head in which blowing nozzles (41) are angled towards the cutting blade shield (2).

FIG. 5 shows a sectional view of a trimmer head showing the blowing air distribution chamber (40) with integrated blowing nozzles (41). Extra air is added by the EJECTOR effect. In this design the blowing air nozzles (41) are placed at a larger distance from the trimmer head housing and the blowing air nozzles (41) and the arrow (15) shows that the air-flow from the blowing air nozzles (41) is directed towards the cutting blade shield (2) and the vacuum air intake (34).

FIG. 6 is a magnified section view of part of a trimmer head of the invention. It shows housing (27), the cutting blade shield (2), the ground shield (10), the intake air guide plate (11), the cutting blade (8), the separating wall (12), the separation wall (9) and the height of the vacuum air intake (34), which is in the range of 7-8 mm in this design. The arrow (15) visualizes the air-flow towards the cutting blade shield (2).

Figure 8:
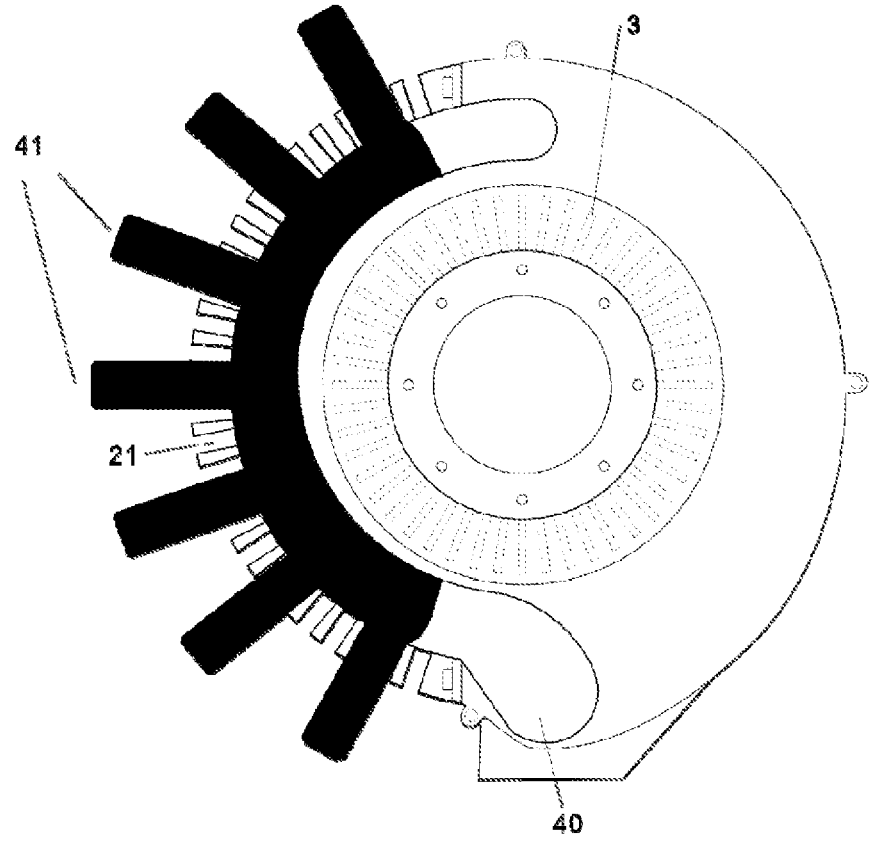
FIG. 8 shows a top view of the embodiment of FIG. 7.

FIGS. 7 and 8 show an embodiment using flexible air nozzles instead of rigid nozzles. The blowing air nozzles (41) for the blowing air are made in one piece in this embodiment and are attached to the blowing air distribution chamber (40). The air nozzle (41) is attached to the top of the blowing air distribution chamber (40). The nozzle (41) has a first direction upwards, then turning downwards to the desired designed outlet angle and outlet position. This design is made to avoid kinks that could restrict the air-flow when the blowing air nozzle (41) is pushed towards the blowing air distribution chamber (40).

An example of the shape of the bent shape of air nozzle (41) when it is pushed against an object like a wall, stone, a trunk of a tree or other is shown. The result is a portion of the air stream will hit the object also and change direction. The redirected air-flow will connect to the main blowing and vacuum air-flow to push and pull grass or other vegetation growing close to the object towards the cutting blade shield (2) and cutting blade shield openings (21). The arrow (15) exemplifies the air-flow from the blowing air nozzle (41) towards the cutting blade shield (2).

FIG. 8 is a top view of the embodiment shown in FIG. 7, additionally showing the air intake (3) for the blowing fan.

Several advantages of the invention are identified below:

Using a totally shielded cutting blade is safer as only objects smaller than the cutting blade shield openings could come through.

The shielded cutting blade will stay sharp for a longer period of time.

The shielded cutting blade is safer and does not destroy objects or scalp the vegetation.

Most of the cut vegetation will stay outside the trimmer and cutting device housing and remaining pieces will be cut into smaller pieces by the cutting blade knives.

The maximum working speed of the of the power source will be more stable. No noise peaks caused by worn or broken trimmer line increasing the rotational speed as there is always a stable power needed to drive the centrifugal fans.

The vacuuming and blowing air stream overpower the fan effect of the cutting blade. This means, the remaining airstream will bring the vegetation closer to the cutting head, not in the opposite direction.

The blowing air will also keep the cutting blade shield free from already cut vegetation. This will work in all situations as the blowing air always has full power.

The blade and fans are inside the trimmer head housing, which reduces the noise level. At 8000 RPM speed, the cutting blade have a 1st order frequency of 400 Hz and the fans with 14 fan wings have a 1st order frequency of 1867 Hz. These frequencies are relatively high, which enables the housing to work as a silencer.

The noise level is also lower than using a trimmer line due to the centrifugal fans would be dimensioned for a lower pulling torque and power compared to pulling trimmer lines. The power to pull a trimmer head with trimmer lines is actually quite high, commonly in the 400-800 W range or even higher for thick and long lines.

The noise level can be related to the pulling power. The relative noise dB level should therefore follow the equation below;

$$\text{Relative Noise Level (dB)} = 10 \times \log(\text{Fan Power [W]}/\text{Trimmer Line Power [W]}).$$

For example, if it takes 700 W to pull the trimmer line and 400 W to pull the fans, the noise level for the fans should be about 2.4 dB lower.

The power to pull the cutting blade as such at no-load is low compared to the fan power and is not significant.

The power needed to cut grass with a sharp flat thin cutting blade is significantly lower compared to using a trimmer line.

Robotic Lawn Mowers is also a suitable application for the subject invention as it enhances safety and allows the grass to be cut close the perimeter of the lawn. In this, and other potential product applications, there could be a need for a straight shaft attachment instead of a gearbox/flexible shaft (1).

REFERENCE NUMBERS

1 gearbox/flexible shaft
2 cutting blade shield
3 air intake to the blowing air fan
4 blowing centrifugal fan
5 blowing fan scroll
6 vacuum fan scroll
7 vacuum centrifugal fan
8 cutting blade
9 separation wall
10 ground shield
11 intake air guide plate
12 separation wall
14 insert hub
15 air-flow towards and through the cutting blade shield
16 fan scrolls
17 cutting blade knives
18 finger protection
19 vacuum air fan scroll outlet
20 blowing fan clean air outlet
21 cutting blade shield openings
22 air intake
27 housing
28 fan wheel
29 sharp edges
30 air filter
31 washer
32 bolt 33 hub
34 vacuum air intake
35 mounting flange
36 air-flow into the blowing centrifugal fan
37 air-flow from the vacuum air fan scroll outlet (19)
39 fan wings
40 blowing air distribution chamber
41 blowing air nozzles The description herein should be construed as non-limitative of the scope thereof which is defined only by the independent claim. The dependent claims define particular embodiments of the invention.

The invention claimed is:

1. A trimmer head comprising:
a housing,
a cutting blade,
a cutting blade shield with a plurality of through-openings, the cutting blade shield being attached to the housing, the cutting blade being positioned within the cutting blade shield, and
at least one blowing nozzle on the housing and pointing to said blade shield openings such that, in operation, a blowing air flow is directed from the at least one blowing nozzle towards said cutting blade shield openings.

2. The trimmer head according to claim 1, wherein said, at least one, blowing nozzle is flexible.

3. The trimmer head according to claim 1, further comprising a blowing centrifugal fan, the blowing centrifugal fan being positioned in the housing, the blowing centrifugal fan arranged in air-connection with said at least one blowing nozzle, such that, in operation, the centrifugal blowing fan blows air through said, at least one, nozzle.

4. The trimmer head according to claim 3, further comprising an air filter arranged upstream the blowing centrifugal fan, the air filter being on the housing, such that, in operation, the air filter filters an intake air to the blowing centrifugal fan.

5. The trimmer head according to claim 3, further comprising a blowing air distribution chamber, positioned on the housing, the blowing air distribution chamber being arranged in air-connection between the at least one blowing nozzle and the blowing centrifugal fan, such that, in operation, the centrifugal blowing fan blows the air from said blowing air distribution chamber to said at least one blowing nozzle.

6. The trimmer head according to claim 5, wherein the blowing air distribution chamber is detachable from the housing.

7. The trimmer head according to claim 3, further comprising a vacuum air intake, wherein the vacuum air intake is arranged as an opening in the housing behind the cutting blade shield, wherein the blowing air flow and vacuum air flow from the vacuum air intake are directed to the cutting blade shield.

8. The trimmer head according to claim 7, further comprising a vacuum centrifugal fan, the vacuum centrifugal fan being positioned is the housing, the vacuum centrifugal fan arranged in air-connection with the vacuum intake.

9. The trimmer head according to claim 8, wherein the blowing centrifugal fan and the vacuum centrifugal fan are integrated in a single fan wheel having a separation wall in between the blowing centrifugal fan and the vacuum centrifugal fan.

10. The trimmer head according to claim 9, wherein the blowing centrifugal fan and the vacuum centrifugal fan each have 8 to 20 fan wings.

11. The trimmer head according to claim 10, wherein the blowing centrifugal fan and the vacuum centrifugal fan have 14 of the fan wings each.

12. The trimmer head according to claim 10, wherein the fan wings are straight-shaped.

13. The trimmer head according to claim 1, further comprising a ground shield attached to the housing.

14. The trimmer head according to claim 13, wherein the ground shield is detachable from the housing.

15. The trimmer head according to claim 1, wherein each of the plurality of openings has a width in the range of 4 to 12 mm.

16. The trimmer head according to claim 1, wherein cutting blade shield is detachable from the housing.

* * * * *